Patented Dec. 6, 1938

2,138,827

UNITED STATES PATENT OFFICE 2,138,827

METHOD OF BREAKING DOWN AND UTILIZING THE CONSTITUENTS OF POLYHALITE

Reginald K. Bailey, Lawrence, Kans.

No Drawing. Application August 3, 1937,
Serial No. 157,165

5 Claims. (Cl. 71—59)

(Granted under the act of March 3, 1883, as amended April 30, 1928; 370 O. G. 757)

This invention may be used by or for the Government of the United States for all governmental purposes without the payment of any royalty thereon.

This invention relates to processes for breaking down the mineral polyhalite and more particularly to processes in which the potassium sulphate constituent is rendered readily soluble in water and separable from certain of the other constituents of the polyhalite.

It is well known that polyhalite, a natural mineral substance with the composition expressed by the chemical formula $2CaSO_4, MgSO_4, K_2SO_4, 2H_2O$ when put in contact with water allows the soluble constituents to dissolve only very slowly. This is due to the formation of gypsum and other slightly soluble salts on the surface of the polyhalite which act as a protective coating to prevent further leaching of the soluble constituents in the interior of the particles.

When polyhalite is finely ground certain of its constituents go into solution more readily than when it is in the crude state. But even when it is finely ground and calcined much time is required for the leaching of potassium sulphate therefrom even at high temperatures because of the creation of the protective coating of gypsum hereinbefore mentioned together with the formation of other slightly soluble or insoluble substances such as reformed polyhalite, syngenite, etc. Due to the above discussed difficulties and the fact that the solution obtained by leaching the polyhalite with water is of a low concentration, it follows that this method of potassium sulphate extraction is not commercially practicable. Various attempts have been made heretofore to overcome the above mentioned difficulties but with results that have not been found entirely satisfactory.

For example, finely ground polyhalite has been mixed with a dilute solution of potassium sulphate or water and the resultant mixture heated in a closed vessel at a temperature of over 200° C. for about an hour, as a result of which the ore is changed so as to yield on leaching a fairly concentrated solution of potassium sulphate and a lesser amount of magnesium sulphate.

Other proposed processes for the separation of potassium salts from polyhalite, syngenite and alunite have included the use of lime or sodium chloride under conditions that render the processes economically impracticable.

The present invention is directed to a method of extracting potassium sulphate from polyhalite or a method of rendering the potassium sulphate constituent of polyhalite readily soluble in water along with another water soluble fertilizer constituent when the polyhalite is combined under the proper conditions with said other fertilizer constituent. The invention is based upon the discovery that when polyhalite granules are submerged in or coated with molten sodium nitrate the water of crystallization contained in the polyhalite is driven off and molten sodium nitrate penetrates into the interstitial pore space of the polyhalite to render the potassium sulphate and magnesium sulphate constituent of the melt readily soluble along with the added sodium nitrate without the formation of difficultly soluble or insoluble substances.

The principal object of this invention is to provide a process by which polyhalite may be broken down to form readily soluble salts or fertilizing materials in the minimum of time.

Another object of this invention is to provide a process which may be carried out at a relatively low temperature.

A further object of this invention is to provide a process in which certain of the products formed from the breaking down of polyhalite are readily soluble.

A further object of this invention is to provide a process in which the substances used in breaking down polyhalite may be recovered.

A further object of this invention is to provide a process in which the substances used in breaking down polyhalite need not be recovered but may be used in combination with certain of the constituents of the polyhalite as when a fertilizing material is desired.

A still further object of this invention is to provide a process in which the products produced by the breaking down of polyhalite are prevented from reforming difficultly soluble substances.

Other objects and advantages will appear in the following specification, and the novel features of the invention will be particularly pointed out in the appended claim.

The invention will be best understood by giving specific examples, but it will be understood that this is for the purpose of illustration only, and that the processes may be varied as to substances, quantities and temperatures within limits, without departing in the least from the spirit and scope of the invention.

In carrying out the invention polyhalite in a granular condition (10 to 20 mesh) is added to molten sodium nitrate. The water of crystallization of polyhalite is driven off as vapor and the constituents of the polyhalite form a more or less homogenous melt with the sodium nitrate. Polyhalite may be added so long as the melt is liquid enough to enter the pore space in the polyhalite that is produced by the driving off of the water of crystallization. The addition of polyhalite is limited to conditions where the temperature of melt does not decompose the sodium nitrate to a great extent and the melt does not become too solid.

Certain of the components of the melt either hot or cold go into the solution in water readily with the separation of the major part of the calcium sulphate constituent from the solution in such a condition that it is easily filtered off from the rest of the dissolved melt. The ease with which potassium sulphate and magnesium sulphate go into solution is due to the presence of the very soluble sodium nitrate in the melt which promotes disintegration of the melt and prevents the formation of difficultly soluble substances such as reformed polyhalite, syngenite, etc.

The temperature used in breaking down the polyhalite by the above process is somewhat above that at which polyhalite loses the major part of its water of crystallization and below that of substantial decomposition of the sodium nitrate. The range of 300° to 500° C. is the temperature used.

Further separation of any of the desired constituents of the broken down polyhalite can be made by methods already known to the art.

The process may be practiced as a continuous process in the following manner. Granulated polyhalite may be intimately mixed with or coated with sodium nitrate at ordinary temperatures and the resultant mixture sent through a revolving tubular furnace of the cement type. The same reactions take place in the continuous process as take place in the batch process as described above. The amount of sodium nitrate used in the continuous process is less than that required in the batch process, as the sodium nitrate used is just sufficient to thoroughly coat the grains of polyhalite before heating and on heating the sodium nitrate enters the pore space produced within the polyhalite by the loss of the water of crystallization. In the continuous process the amount of sodium nitrate should be kept sufficiently low as to not produce a product that will adhere too strongly to the walls of the revolving furnace during the heating treatment.

By this method the sodium nitrate used is less and the process is a continuous one and permits quantity production. It has all the advantages of the batch process described above. The various constituents of the fused sodium nitrate polyhalite product obtained from the continuous process utilizing the revolving furnace may be further separated or refined by the methods known to the art or the product after cooling may, like that produced by the batch method described hereinbefore, be broken up or ground to the desired fineness and used directly as fertilizer where potassium sulphate and sodium nitrate are both desired.

What I claim is:

1. The method of rendering the potassium sulphate constituent of polyhalite readily separable from the calcium sulphate constituent thereof which comprises elevating the temperature of the polyhalite and driving out the major part of the water of crystallization thereof in intimate contact with sodium nitrate whereby molten sodium nitrate penetrates the pore space produced within the polyhalite by the loss of the water of crystallization thereof to render the potassium sulphate soluble in water along with the sodium nitrate.

2. The method of breaking down the mineral polyhalite which comprises adding polyhalite particles to molten sodium nitrate having a temperature of from 350° to 500° C. so long as the melt is relatively liquid in character, and subsequently leaching the readily soluble sulphate constituents of the polyhalite therefrom along with sodium nitrate.

3. The method of preparing a material having an appreciable percentage of potassium sulphate and sodium nitrate therein in a form that permits these constituents to be readily dissolved in water which comprises dividing mineral polyhalite into particles of such a size as to permit them to pass through a screen of from 10 to 20 mesh to the inch, then treating said particles to drive off a major portion of the water of crystallization therein in intimate association with sodium nitrate, whereby molten sodium nitrate, in part at least, penetrates into the pore space provided in the polyhalite when the water of crystallization was driven off, subsequently cooling the melt produced and comminuting the product to produce a material of such a fineness as to permit it to be used commercially as a fertilizer.

4. The method of breaking down polyhalite which comprises intimately mixing polyhalite granules with sodium nitrate and heating the resultant mixture to a temperature of from 350° to 500° C for a length of time sufficient to drive off the major portion of the water of crystallization of the polyhalite, and subsequently leaching the melt with water to separate the potassium sulphate and sodium nitrate from the calcium sulphate constituent of the polyhalite.

5. The method of treating polyhalite which comprises intimately mixing polyhalite granules with sodium nitrate sufficient to thoroughly coat the grains of polyhalite and sending the resultant mixture through a furnace to drive off the water of crystallization of the polyhalite while keeping the temperature of the furnace sufficiently low as to prevent the substantial decomposition of the sodium nitrate and sufficiently low as to prevent the product from intimately adhering to the walls of the furnace during treatment.

REGINALD K. BAILEY.